United States Patent [19]

Orcutt

[11] Patent Number: 5,346,290

[45] Date of Patent: Sep. 13, 1994

[54] STRUCTURE FOR AIRBRAKE TUBING

[75] Inventor: Eric D. Orcutt, Rockvale, Tenn.

[73] Assignee: Dana Corporation, Toledo, Ohio

[21] Appl. No.: 51,966

[22] Filed: Apr. 26, 1993

[51] Int. Cl.$^5$ .............. F16L 15/00; F16L 41/14; B60T 17/04
[52] U.S. Cl. ........................... 303/7; 138/109; 138/118; 285/206
[58] Field of Search ............ 303/7; 138/109, 118, 138/125; 285/62, 161, 206, 207, 355, 390

[56] References Cited

U.S. PATENT DOCUMENTS

| 1,987,100 | 1/1935 | Dick | 285/62 |
| 2,992,018 | 7/1961 | Rosan | 285/161 X |
| 3,254,399 | 6/1966 | Zahuranec | 285/161 X |
| 3,977,440 | 8/1976 | Phillippi | 138/125 |
| 4,160,466 | 7/1979 | Jousson | 138/115 |
| 4,772,051 | 9/1988 | Mann | 285/62 X |
| 5,111,849 | 5/1992 | Zeh | 138/118 |

OTHER PUBLICATIONS

Parker-Hannifin publication, pp. 139–140, p/e Apr. 24, 1993.

Primary Examiner—Robert J. Oberleitner
Assistant Examiner—Alfred Muratori
Attorney, Agent, or Firm—Millen, White, Zelano & Branigan

[57] ABSTRACT

Brakes mounted on the wheels of slidably adjustable axles used with truck trailers are connected by a pair of flexible coiled tubes to service and emergency air lines. The flexible coiled tubes are mounted one within the other and have identical end fittings which connect directly to service and emergency air lines and directly to airbrake lines. No intermediate fittings are utilized. The end fittings of each coiled tube are also mounted in fixed relation to a transverse support bracket mounted on the trailer body and to a bracket mounted on a rear axle support. Each end fitting has first, second, and third threaded portions, with the first threaded portion coupled to the end of one of the coiled tubes, the second threaded portion being received through a hole in a bracket, and the third threaded portion being coupled with either an air pressure supply line or an airbrake line.

4 Claims, 3 Drawing Sheets

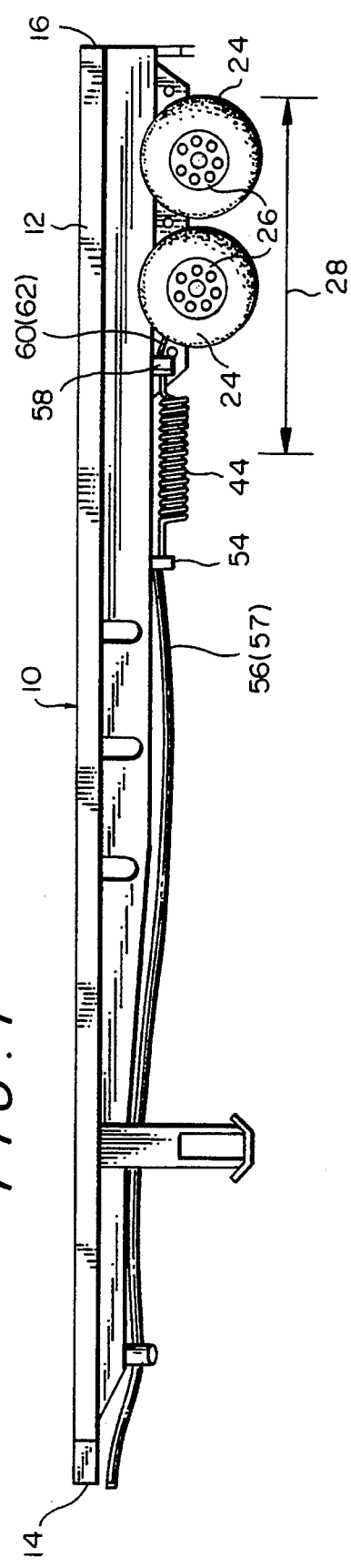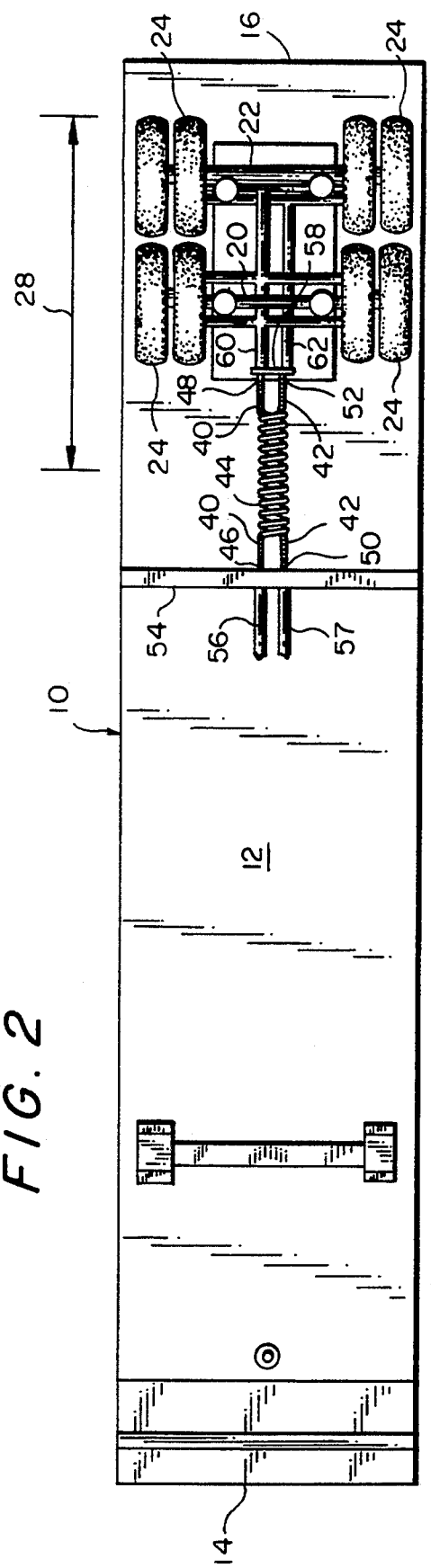

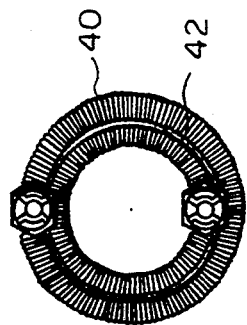
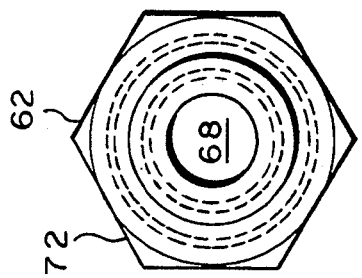
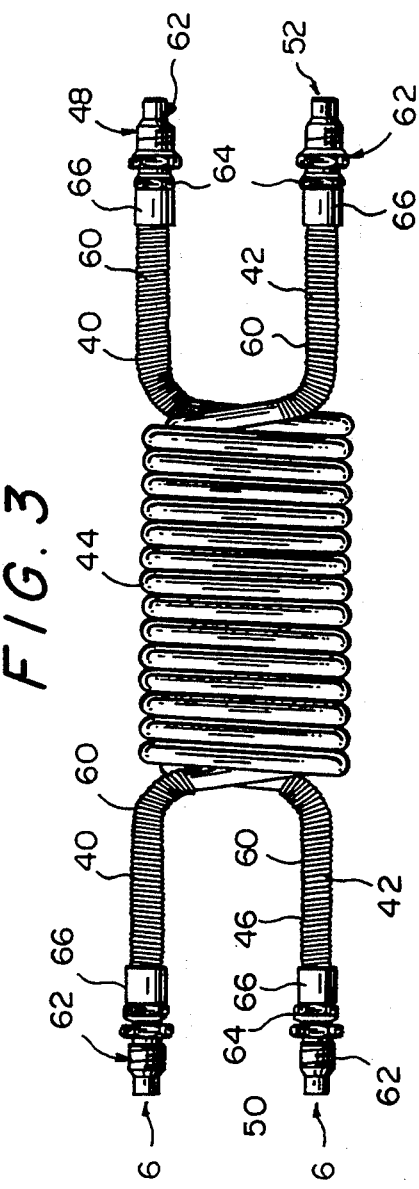
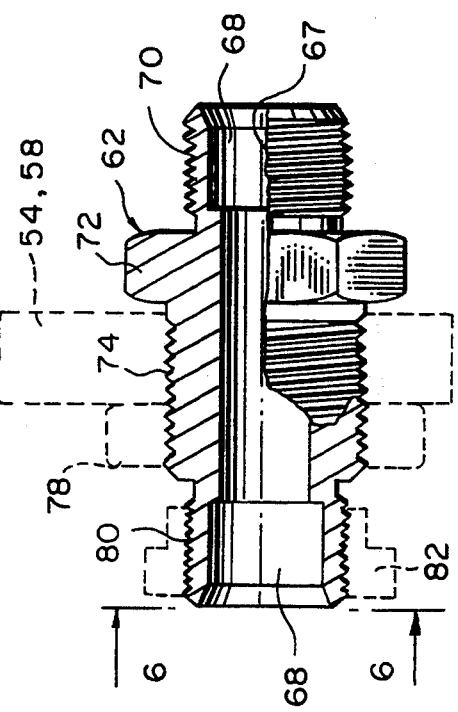

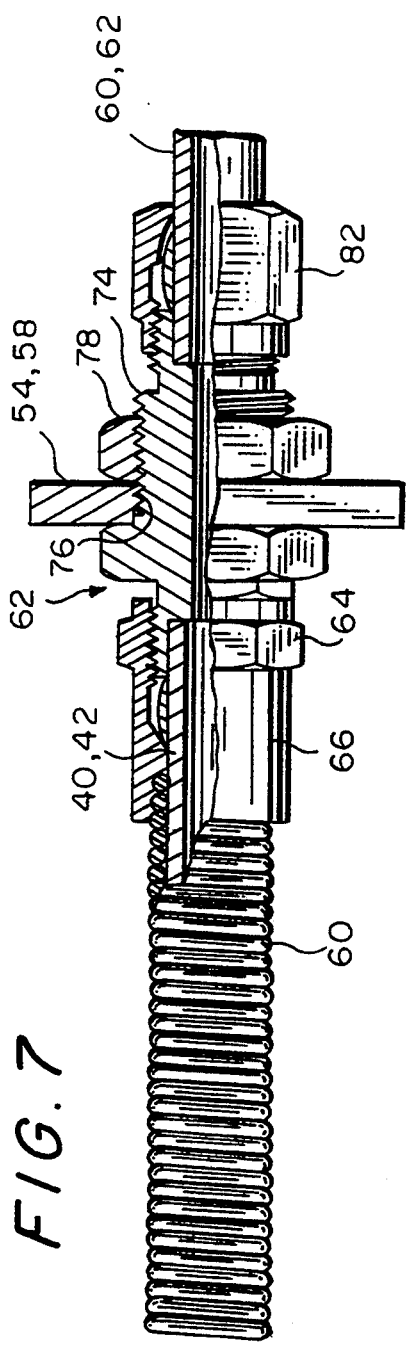
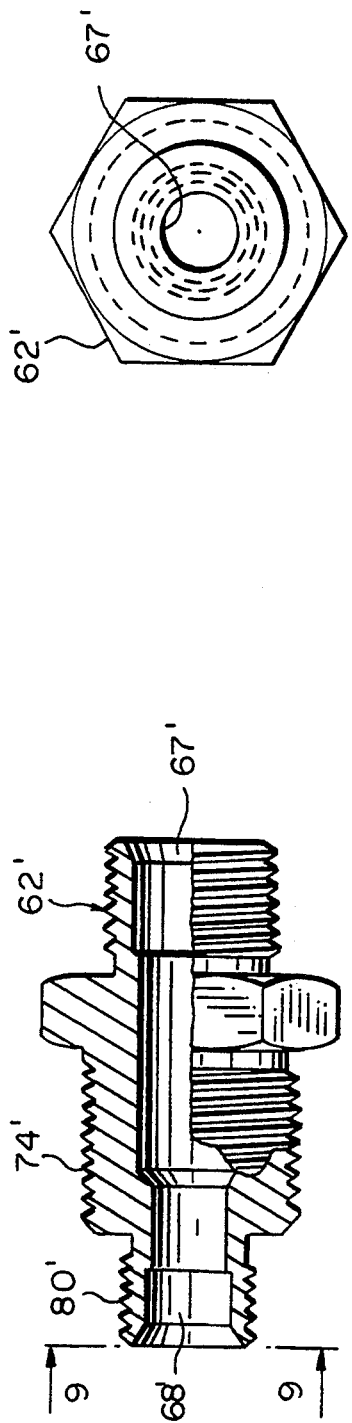

5,346,290

STRUCTURE FOR AIRBRAKE TUBING

FIELD OF THE INVENTION

The invention relates to structures for airbrake tubing. More particularly, the invention relates to structures for airbrake tubing wherein the airbrake tubing is used on truck trailers having adjustable rear axles.

BACKGROUND ART

Truck trailers with long beds are equipped with rear axles which are slidably adjustable to move in forward and rearward directions with respect to the truck bed. It is necessary to have axles which are adjustable in this manner because truck trailers carry loads of various sizes which may have horizontal centers of gravity which are closer to one end of the truck bed than the other. During the past decade, regulations have changed, allowing truck trailers of increased length. Such truck trailers almost necessarily must have rear axles which are slidable fore and aft.

In order to properly stop tractor trailers, it is necessary to brake the wheels of the rear axle or axles, as well as the tractor wheels. This is accomplished a pair of hoses, one of which provides pressurized air for normal service braking and the other of which provides pressurized air for emergency braking. In that the rear axles are movable, the air is supplied through flexible conduits which, in a preferable approach, are configured as coiled tubes which expand and contract as the rear axles are moved fore and aft on the trailer bed.

Currently available end fittings for coiled airbrake tubes require additional end fittings for installation, which additional end fittings complicate both installation and maintenance. Moreover, current approaches require NPT or NPTF pipe fittings, which result in additional connections and, therefore, additional points of possible leakage.

SUMMARY OF THE INVENTION

In view of the aforementioned difficulties, it is a feature of the instant invention to provide airbrake tubing for use with brakes on truck trailers having at least one adjustable axle, whereby the number of fitting connections is minimized.

In view of the aforementioned feature, as well as other features, the instant invention contemplates a pair of coiled airbrake tubes with one tube coiled inside of the other, wherein the same fittings are used at each end of each hose for both securing the ends of the hoses to trailer and rear axle brackets and establishing fluid-tight connections with air supply and airbrake lines.

In accordance with a preferred embodiment of the end connections, each end connection comprises a threaded connector having first and second ends, wherein the first end has a first thread threaded within a spring-nut assembly affixed to the coiled tube and a second end having second and third threaded portions. The second threaded portion is of a diameter greater than the third threaded portion and anchors the coiled tubes to a trailer or rear axle bracket. The third threaded portion is received in either an air pressure supply fitting or an air brake fitting connected to the brake.

BRIEF DESCRIPTION OF THE DRAWINGS

FIG. 1 is a side view of a truck trailer with an adjustable rear axle connected to coiled airbrake tubing configured in accordance with the instant invention;

FIG. 2 is a bottom view of the truck trailer of FIG. 1;

FIG. 3 is a side view of coiled airbrake tubing having end fittings configured in accordance with the principles of the instant invention;

FIG. 4 is an end view of the coil of FIG. 3 taken in the direction of arrows 4—4;

FIG. 5 is a side view, partially in elevation, showing a first embodiment of an end fitting in accordance with the instant invention;

FIG. 6 is an end view of the fitting of FIG. 5;

FIG. 7 is a side view, partially in elevation, showing the end fitting of FIGS. 5 and 6, connected to a coiled airbrake tube and either an air pressure supply or an airbrake tube.

FIG. 8 is a side view, partially in elevation, showing a second embodiment of an end fitting in accordance with the instant invention; and FIG. 9 is an end view of the fitting of FIG. 7.

DETAILED DESCRIPTION

Referring now to FIGS. 1 and 2, there is shown a truck trailer 10 having a bed 12 with a front end 14 for attachment to a tractor and a rear end 16. Positioned proximate the rear end 16 of the trailer bed 12 are rear axles 20 and 22 which support pairs of tires 24 thereon. Each tire set 24 has a brake 26 which is energized to stop rotation of the tires upon pushing a brake peddle in the cab of the tractor (not shown) towing the truck trailer 10.

In accordance with conventional practice, the axles 20 and 22 may be moved toward and away from the front and rear ends 14 and 16, respectively, of the trailer bed 12 to accommodate loads of different weights and configurations. The axles 20 and 22 are fixed in selected positions prior to loading the truck trailer 10, and the selected fixed positions are maintained during the trip.

The brakes 26 are supplied with pressurized air through a coiled service tube 40 and a coiled emergency tube 42. The emergency tube 42 is red in color and is coiled inside the service tube 40, which is blue in color, to form a coiled nest 44 along a substantial portion of the lengths of the tubes. The service tube 40 has first and second ends 46 and 48, while the emergency tube 42 has first and second ends 50 and 52. The first ends 46 and 50 of the tubes 40 and 42 are secured to a bracket 54 fixed to the bottom of the trailer bed 12 for connection to sources of air pressure, provided by air source lines 56 and 57. The air source lines 56 and 57 are connected to an air source in the tractor (not shown) to supply air for the brakes 26. The second ends 48 and 52 of the coiled tubes 40 and 42 are fixed to a second bracket 58 which is attached to move with the axles 20 and 22 as the axles are moved fore and aft. Connected to the second ends 48 and 52 of the coiled tubes are airbrake lines 60 and 62. The bracket 58 and the lines 60 and 62 move with the axles 20 and 22 as the position of the axles is adjusted with respect to the front and rear ends 14 and 16 of the trailer 10. As the second bracket 58, lines 60 and 62 and axles 20 and 22 move, the coil nest 44 stretches and contracts to maintain the connection between the air pressure source lines 56 and 57 and airbrake lines 60 and 62. The coil 44 may stretch a distance of 4–10 feet to accommodate whatever axle movement is necessary for a particular load configuration.

Referring now to FIGS. 3 and 4, where the coiled tube nest 44, made of the coiled service tube 40 and coiled emergency tube 42, is shown in more detail, it is seen that proximate the first and second ends 46, 50, and 48,52, respectively, of each of the coiled tubes 40 and 42, protective springs 60 are positioned to cover the uncoiled portions of the tubes. Disposed outboard of each of the coil springs 60 is an end fitting 62. There are four identical end fittings 62, each of which is received within an identical spring nut assembly 64 on one of the coiled tubes 40 and 42. Each nut assembly 64 also includes an external tube support sleeve 66, which fits around the outside of the respective tube 40 or 42 (see also FIG. 7).

Referring now specifically to FIGS. 5, 6, and 7, where first embodiment of an end fitting configuration in accordance with the present invention is shown enlarged and in detail, it is seen that each end fitting 62 includes a first threaded end portion 70, which is threadably received within the nut 64. Disposed proximate the first threaded end portion 70 is a hex nut portion 72. On the other side of the hex nut portion 72 is a second threaded portion 74, which is received through a bore 76 in the bracket 54 or 58 to which the end fitting 62 is mounted. A second nut 78 is threaded onto the second threaded portion 74 of the end fitting 62 to retain the end fitting 62, and thus the coiled tube 40 or 42 connected thereto, to the bracket 54 or 58. A third threaded portion 80 of the end fitting 62 is threaded into the service air source line 56, emergency air source line 57, service airbrake line 60, or emergency airbrake line 61, depending on which of the coiled tubes 40 or 42 the end fitting 62 is mounted. A nut 82 on the air source lines 56 or 57 or the brake lines 60 or 62 is used to threadably make the appropriate connection.

Referring now to FIGS. 8 and 9, a second embodiment 62' of the end fitting 62 is shown. The end fitting 62' is essentially the same as the end fitting 62, with the exception of a smaller diameter third threaded portion 80'. As is seen in FIGS. 7 and 8, the air or brake line connecting bore 68' has a diameter less than the air or brake connecting bore 68 of the end fitting 62, while the coiled tube connecting bore 67' has a diameter the same as the coiled tube connecting bore 67 of the end fitting 62.

The dimensions of the various components of end fittings 62 and 62' are preferably such as to couple with service and emergency coiled tubes 40 and 42 having an outside diameter of about ½-inch.

From the foregoing description, one skilled in the art can easily ascertain the essential characteristics of this invention and, without departing from the spirit and scope thereof, can make various changes and modifications of the invention to adapt it to various usages and conditions.

I claim:

1. In combination with a truck trailer having at least one axle movable fore and aft with respect to the truck trailer, the truck trailer having a service supply line for providing compressed air for service braking of wheels mounted on the axle, an emergency air supply line for providing emergency air pressure to the brakes of the wheels, a service airbrake line connected to the brakes, and an emergency airbrake line connected to the brakes, the improvement comprising:

a first bracket fixed to the truck trailer at a location proximate the ends of the service air and emergency air supply lines and a second bracket fixed to the truck trailer at a location proximate the ends Of the service and emergency airbrake lines, wherein the second bracket is fixed with respect to the axle for movement with the axle, the brackets having openings therethrough;

a first tube having first and second ends and a coiled portion between the first and second ends, the first tube being connected to the service air supply line at the first end with a spring nut and to the service air brake line at the second end with a spring nut;

a second tube having first and second ends and a coiled portion between the first and second ends, the coiled portion of the second tube being disposed within the coiled portion of the first tube, the second tube being connected to the emergency air supply at the first end with a spring nut and emergency airbrake line at the second end with a spring nut; and four identical unitary end fittings mounted in openings in the brackets for connecting the first and second ends of the first and second tubes directly to the air supply and airbrake lines with second nuts;

the four identical end fittings comprising:

first threaded portions for threadably connecting by threadable engagement only with the spring nuts on one of the ends of the coiled tubes;

second threaded portions being received through the openings in the respective brackets;

third threaded portions of a diameter less than the second threaded portions for threadably engaging nuts on the airbrake or air supply lines;

unitary nut portions unitary with and located between the first and second threaded portions for engaging one side of the brackets, and second nuts threadably mounted on the second threaded portions by threadable engagement only for securing the end fittings to the brackets by sandwiching the brackets between the second nuts and the unitary nut portions.

2. The combination of claim 1, wherein coil springs are coiled around the coiled tubes proximate the first and second ends thereof and wherein the spring nuts on the first and second ends of the coiled tubes have collars at one end which receive the coil springs and threads in the other ends which thread onto the first threaded portions of the end fittings.

3. The combination of claim, 2 wherein the nuts are axially separated from one another with no interconnecting structure therebetween other than the end fittings when threaded on the end fittings.

4. The combination of claim 3, wherein the third threaded portion has a diameter smaller than the first threaded portion.

* * * * *